United States Patent
Barel

(10) Patent No.: US 12,446,083 B2
(45) Date of Patent: Oct. 14, 2025

(54) SONIC INITIATION OF DEVICE INTERACTIVITY

(71) Applicant: Microsoft Technology Licensing, LLC, Redmond, WA (US)

(72) Inventor: Eliyahu Barel, Rosh-HaAyin (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 273 days.

(21) Appl. No.: 18/184,822

(22) Filed: Mar. 16, 2023

(65) Prior Publication Data

US 2024/0314863 A1   Sep. 19, 2024

(51) Int. Cl.
*G01S 5/22* (2006.01)
*H04B 11/00* (2006.01)
*H04W 76/14* (2018.01)

(52) U.S. Cl.
CPC .............. *H04W 76/14* (2018.02); *G01S 5/22* (2013.01); *H04B 11/00* (2013.01)

(58) Field of Classification Search
CPC .......... G01S 5/22; H04W 76/14; H04B 11/00
See application file for complete search history.

(56) References Cited

U.S. PATENT DOCUMENTS

| | | | | |
|---|---|---|---|---|
| 5,485,432 | A * | 1/1996 | Aechter | G01S 7/539 367/12 |
| 8,274,860 | B2 * | 9/2012 | Tran | G01F 1/667 367/902 |
| 8,760,962 | B2 * | 6/2014 | Kloss | G01S 15/931 367/13 |
| 10,360,593 | B2 * | 7/2019 | Hunter | H04W 4/06 |
| 2007/0010200 | A1 * | 1/2007 | Kaneko | G01S 11/14 370/328 |
| 2008/0319349 | A1 * | 12/2008 | Zilberman | A61B 5/0031 600/587 |
| 2009/0195402 | A1 * | 8/2009 | Izadi | H04W 76/14 340/686.6 |
| 2011/0035183 | A1 * | 2/2011 | Kaneyasu | B25J 13/089 702/150 |

(Continued)

FOREIGN PATENT DOCUMENTS

CN   105830370 A   8/2016

OTHER PUBLICATIONS

International Search Report and Written Opinion received for PCT Application No. PCT/US2024/018756, Jun. 7, 2024, 12 pages.

*Primary Examiner* — Daniel L Murphy
*Assistant Examiner* — Amie M Ndure
(74) *Attorney, Agent, or Firm* — Alleman Hall & Tuttle LLP

(57) ABSTRACT

The disclosure provides for, at a host computing device, a method of interacting with a target computing device. The method includes receiving one or more sonic waveforms from the target computing device at a microphone subsystem of the host computing device. The host computing device determines an identity of the target computing device via processing of the one or more sonic waveforms. In response to said identity determination, the method includes (1) initializing a wireless data link for communication between the host computing device and the target computing device, and (2) entering a mode of host-target interactivity in which the host computing device and the target computing device interact via the wireless data link.

20 Claims, 6 Drawing Sheets

(56) References Cited

U.S. PATENT DOCUMENTS

| | | | | |
|---|---|---|---|---|
| 2013/0124030 A1* | 5/2013 | Olson | .................... | G05D 1/028 |
| | | | | 701/23 |
| 2013/0135115 A1* | 5/2013 | Johnson | .............. | H04W 56/001 |
| | | | | 340/870.02 |
| 2013/0297422 A1* | 11/2013 | Hunter | ................... | H04H 60/63 |
| | | | | 705/14.58 |
| 2014/0134951 A1* | 5/2014 | Paulson | ................. | H04L 27/10 |
| | | | | 455/41.2 |
| 2014/0327320 A1* | 11/2014 | Muhs | ..................... | A43B 3/38 |
| | | | | 307/104 |
| 2016/0076923 A1* | 3/2016 | Baumoel | ................ | G01F 1/662 |
| | | | | 73/1.16 |
| 2019/0265353 A1* | 8/2019 | Jones | .................... | G01S 13/32 |
| 2021/0033696 A1* | 2/2021 | Heinen | ................ | G01S 5/0289 |
| 2022/0343696 A1 | 10/2022 | Ju et al. | | |

* cited by examiner

SONIC INITIATION OF DEVICE INTERACTIVITY

BACKGROUND

Computer users typically have multiple computing devices that they use and connect together in various ways, such as smartphones, laptops, tablet computers, desktop computers, headphones, external display monitors, active stylus input devices, speakers, etc. In some cases, the user will connect one of their devices to a shared device or that of another user. In any case, there may be a large number of device-to-device connections, and the connections may be established and disconnected repeatedly over time to support periods of interactivity between connected devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

The disclosure provides for, at a host computing device, a method of interacting with a target computing device. The method includes receiving one or more sonic waveforms from the target computing device at a microphone subsystem of the host computing device. The host computing device determines an identity of the target computing device via processing of the one or more sonic waveforms. In response to said identity determination, the method includes (1) initializing a wireless data link for communication between the host computing device and the target computing device, and (2) entering a mode of host-target interactivity in which the host computing device and the target computing device interact via the wireless data link.

DETAILED DESCRIPTION

Computing environments commonly involve multiple devices in proximity that interact over wireless data links. Such devices may all be associated with an individual user, or interacting devices may be used/controlled by multiple users. Preparing the devices for interaction digitally over a wireless data link (e.g., connecting the devices) can require various actions from the user. For example, the user might be required to operate a user interface on a device to activate a connection, enter an authorization code or other credentials, select a device to connect to, switch from one connected device to another, etc. These actions can be burdensome and decrease the seamlessness of interaction between devices.

Accordingly, the present disclosure is directed to a sonic-based engagement mechanism that takes initial steps to more efficiently set up subsequent digital interaction over wireless data links. The examples are directed to a host computing device that listens for sonic waveforms from a target computing device. Based at least on the sonic waveforms, the host computing device determines the identity of the target computing device and uses that identity determination to initialize an alternate channel for further interactivity, namely a wireless data link for communication between the two devices. This in turn leads to entry into a mode of interactivity between the devices in which the target computing device and the host computing device interact over the wireless data link. This sonic pre-engagement can eliminate some of the steps that would otherwise be required to initiate interactivity, thereby enabling a more seamless user experience.

Figure 1:
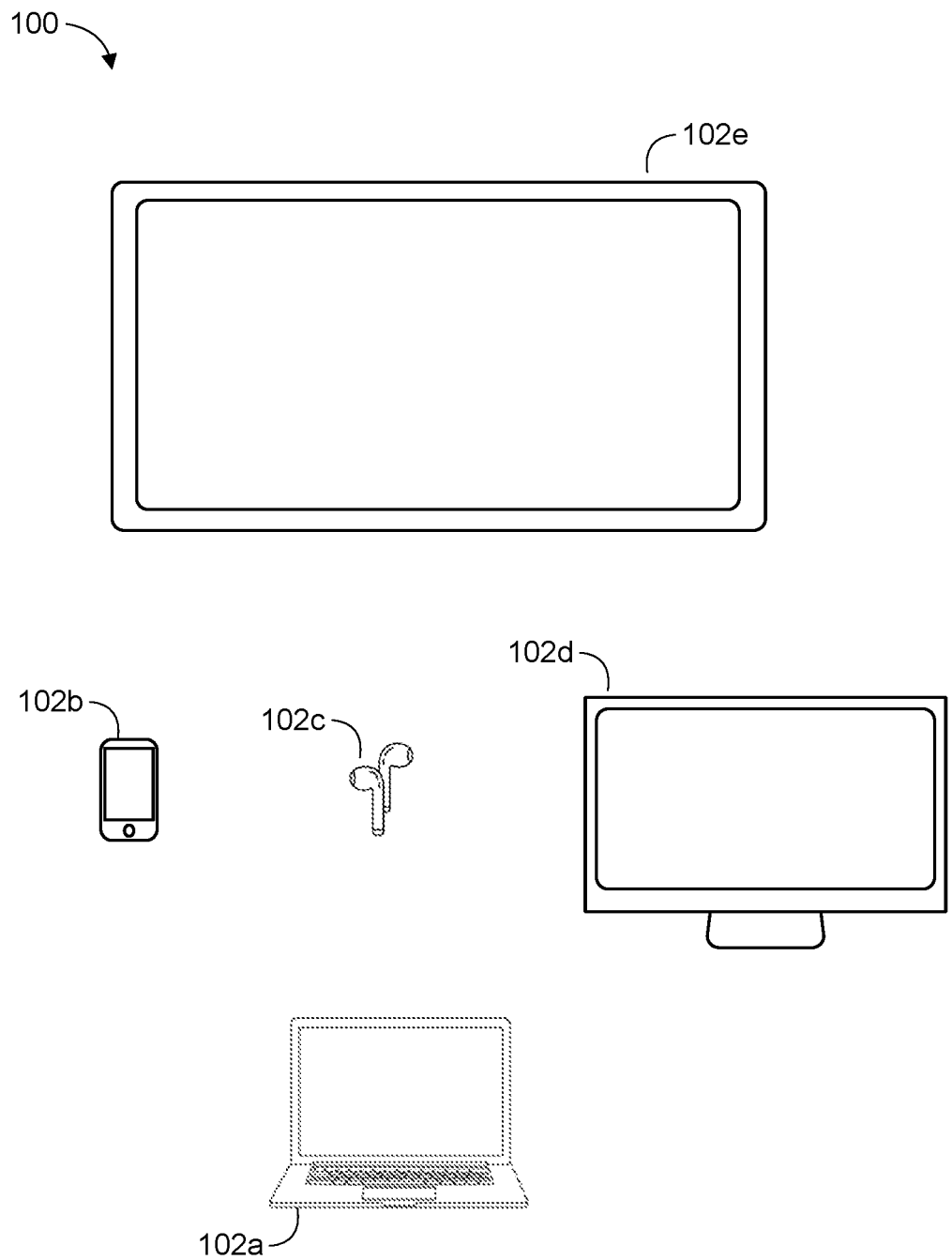
FIG. 1 depicts an example computing environment including computing devices configured to interact sonically to initialize subsequent connection and interactivity.

Referring now to FIG. 1, a computing environment 100 is depicted in which multiple computing devices 102 potentially interact with each other. As indicated in the example, devices 102 can include laptop computers 102a, smartphones 102b, earphones 102c, display monitors 102d (e.g., an external display for use with a laptop), and large format collaborative devices 102e (e.g., mounted to a wall in a conference room). The depicted environment is exemplary-any number and type of computing devices may be in the interactive environment, and associated with one or any other number of users.

As will be discussed in detail below, a sonic-based method can be used as an initial mode of interactivity to trigger and trigger a subsequent, alternate mode of interaction between devices over a wireless data link. The discussion is applicable to setting up any type of interactivity over a wireless data link. In the example of FIG. 1, this can include earphones 102c sending audio to various of the other devices. Laptop 102a can be connected to display monitor 102a or collaborative device 102e to use them as display screens. Smartphone 102b can similarly connect to laptop computer 102a, display monitor 102d and/or collaborative device 102e. The devices can interact to exert control over and operate various software applications. These are but examples, any suitable type of interactivity may occur over the wireless data link.

Depending on the scenario, a computing device 102 can act as a host computing device or a target computing device, or both. The host functionality refers to using a microphone subsystem to listen for and identify a target device. As described below, in some cases the host computing device also determines a location of the target computing device relative to the host computing device.

Figure 2:
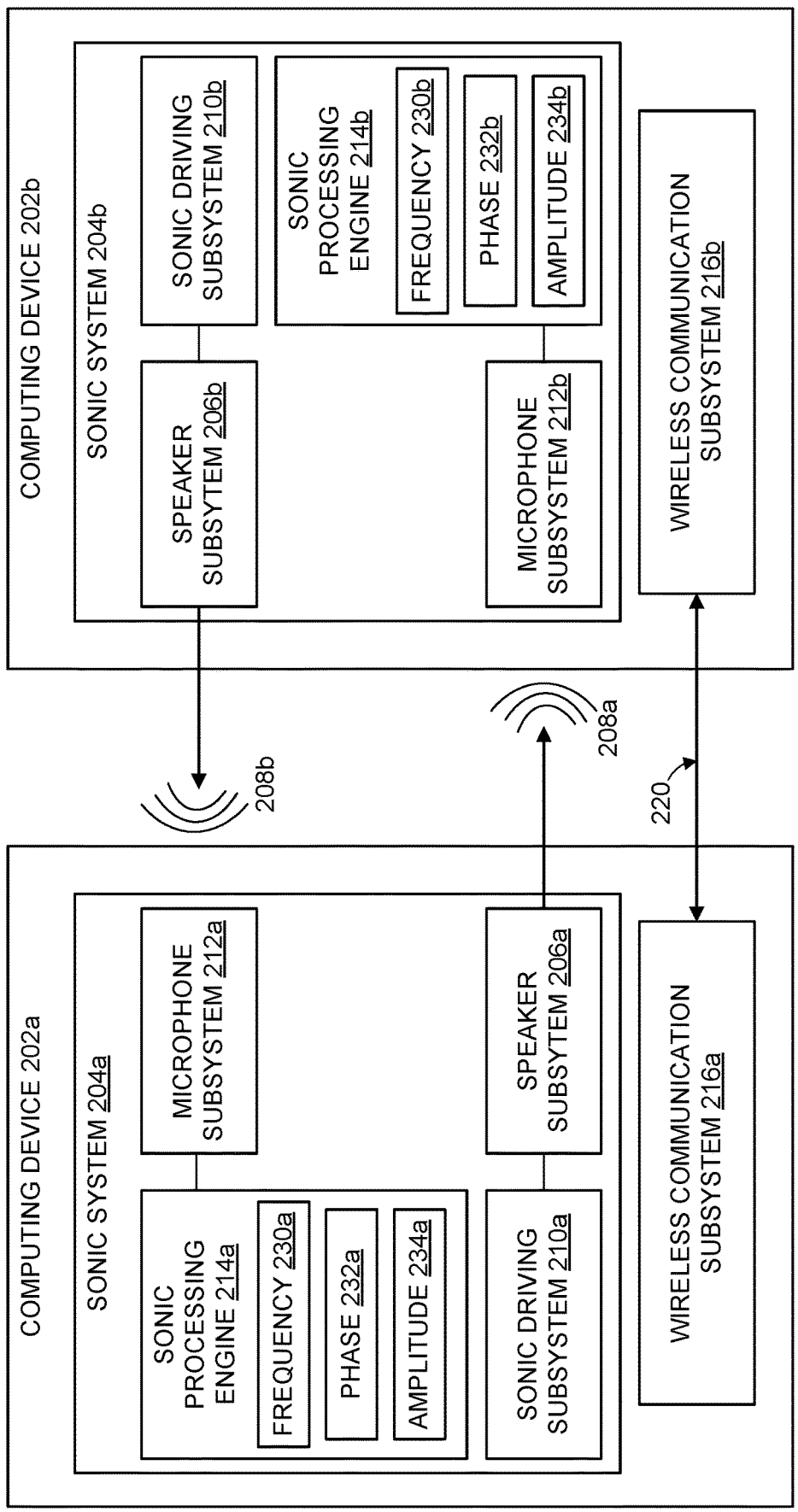
FIG. 2 depicts example computing devices configured to use sonic interaction to initialize subsequent connection and interactivity.

Referring now to FIG. 2, the figure depicts computing devices 202a and 202b configured to engage in an initial sonic interaction to more seamlessly and efficiently lead to regular digital interactivity between the devices over a wireless data link. The initial sonic interaction includes a first one of computing devices 202 receiving sonic waveforms from the other and processing those waveforms to identify the other device. The first receiver of sonic waveforms in the sonic engagement (i.e., the initial listener) will be described as the "host computing device," with the other being referred to as the "target computing device," because its identity is being acquired by the host computing device (i.e., it is the "target" of the host's listening function). Accordingly, it will be understood that either device can be the host and either can be the target, and in some cases a device can function as both. Generally, the host functionality is to recognize the presence and identity of a target device, and in some cases to map the location of the target device in the space surrounding the host device. When one of devices 202a and 202b is referred to as the "host computing device" in the present discussion, it will be understood that the other is the "target computing device."

Computing devices 202 each include a sonic system 204 (i.e., device 202a includes sonic system 204a and device 202b has sonic subsystem 204b). The sonic systems each include a speaker subsystem 206 configured to transmit sonic waveforms 208 that are generated via operation of sonic driving subsystem 210. The sonic systems also include a microphone subsystem 212 configured to receive sonic waveforms 208. Output from microphone subsystem 212 is passed to a sonic processing engine 214 configured to receive output from microphone subsystem 212 and process and interpret the sonic waveforms. Further, each computing device includes a wireless communication subsystem 216 so that the devices, subsequent to sonic initialization via sonic systems 204, can enter into regular digital interactivity in which the host and target device communication over wireless data link 220.

Although the sonic system 204 of each computing device 202 is depicted as including both a speaker subsystem and a microphone subsystem, in some cases a computing device may only have a microphone subsystem or only a speaker subsystem. An example where each side typically would have both is establishing a Bluetooth or like connection. In particular, to initiate Bluetooth engagement, a host computing device can receive sonic waveforms from a target computing device to identify the target device, and the devices typically then engage in bi-directional sonic communication (e.g., to exchange a password or other credential, and/or other information for establishing the Bluetooth connection). In such a case of bi-directional sonic communications, both sides need transmission capability (speaker subsystem) and reception capability (microphone subsystem). However, for mapping location of target devices (discussed below), the host device can, in typical examples, achieve that mapping functionality without a speaker subsystem for sonically communicating back to the target device. As another example, transitioning a power state of a host computing device (e.g., a "waking" function—also discussed below) can be achieved in typical scenarios by just having sonic listening capability at the host computing device (i.e., speaker subsystem can be omitted). It will further be appreciated that, in scenarios where a host computing device is only listening and not transmitting sonic waveforms back to the target computing device, then a microphone subsystem can be omitted from the target computing device.

Computing devices 202 are exemplary schematic depictions. The devices may include additional components, as described below with reference to FIG. 6. In some cases, the computing devices may employ system-on-chip (SoC) implementations. In some cases, the sonic system 204 will be incorporated into the SoC, while in other implementations the sonic system 204 can be off-chip. Sonic capability in some cases is wholly or partly included within a sensor hub, which may include functionality/components associated with motion sensing (accelerometers, gyro meters), touch interface, trackpad, and various other sensors. The sensor hub typically is connected to or incorporated within the SoC of the computing device.

Sonic driving subsystem 210 can be implemented in any practicable way to drive speaker subsystem 206 to generate sonic waveforms 208. As discussed below, the waveforms are used to identify the device (e.g., to identify target computing device 202b to host computing device 202a). Accordingly, sonic driving subsystem 210b can be driven or provided with any characteristic that enables differentiation of a target computing device from other target computing devices. Any waveform characteristic or feature may be employed, including phase, frequency, amplitude, etc. Static values can be used for these characteristics or any time-varying scheme. Typically, differentiating waveform characteristics will be pre-established between host and target devices for purposes of device identification.

Microphone subsystem 212 may include one microphone or multiple microphones. Where multiple microphones are employed, information about a target computing device 202 can be learned by interpreting differences in how sonic waveforms affect the different microphones. For example, when computing device 202b is the target computing device, a multiple-microphone configuration in microphone subsystem 212a of host computing device 202a can enable mapping of the location of target device 202b. Further examples of such functionality will be explained below. Sonic waveforms 208 in some cases will be ultrasonic, so that the associated functionality can be carried out inaudibly, though other frequency ranges may be employed.

The example computing devices described herein can employ various mechanisms for processing sonic waveforms. Typically, some type of sampling strategy will be used at sonic processing engine 214 to obtain a digital representation of the waveform, with an appropriate sampling rate to achieve desired fidelity while avoiding aliasing and artifacts. Quantization at any desired bit depth can be employed, though in some settings it will be desirable to hold bit depth down and otherwise minimize complexity to no more than is needed to quickly determine the identity of the target computing device and carry out other aspects of the sonic communication. In addition, further processing may be employed to remove noise, filter out unwanted frequencies, adjust amplitude, etc. Feature extraction may also be employed (e.g., to extract frequency, phase, pitch, volume, amplitude, timbre, etc.), as such features can be used in some implementations to establish the identity of a target computing device. In the example of FIG. 2, sonic processing engine 214 includes extracted waveform characteristics (i.e., features of sonic waveforms 208) including frequency 230, phase 232, and/or amplitude 234 for one or more received waveforms.

As indicated elsewhere, an initial sonic identification of the target computing device 204 can be used to seamlessly set up interactivity over the wireless data link in a way that can reduce certain user interventions. Wireless data link 232 can be any appropriate link for digital communication between devices within sonic range of one another, including Bluetooth, WIFI, WIFI direct, NFC, etc. This target identification has the technical effect/advantage of improving the user experience, increasing the speed of connections, reducing lag, ensuring that correct devices are connected to one another, and increasing connection security, among others.

In one example, with computing device 202a as the host computing device, it is configured to determine the identity of target computing device 202b via processing, with sonic processing engine 214a, the one or more sonic waveforms 208b received from target computing device 202b. Typically, the identity determination is made independent of communications that occur over wireless data link 220. In other words, the host computing device 202a may determine identity without reference to any data passing over wireless data link 220. This has the technical effect of enabling downstream interactivity with reduced user intervention (e.g., operating a user interface to connect the devices).

Figure 6:
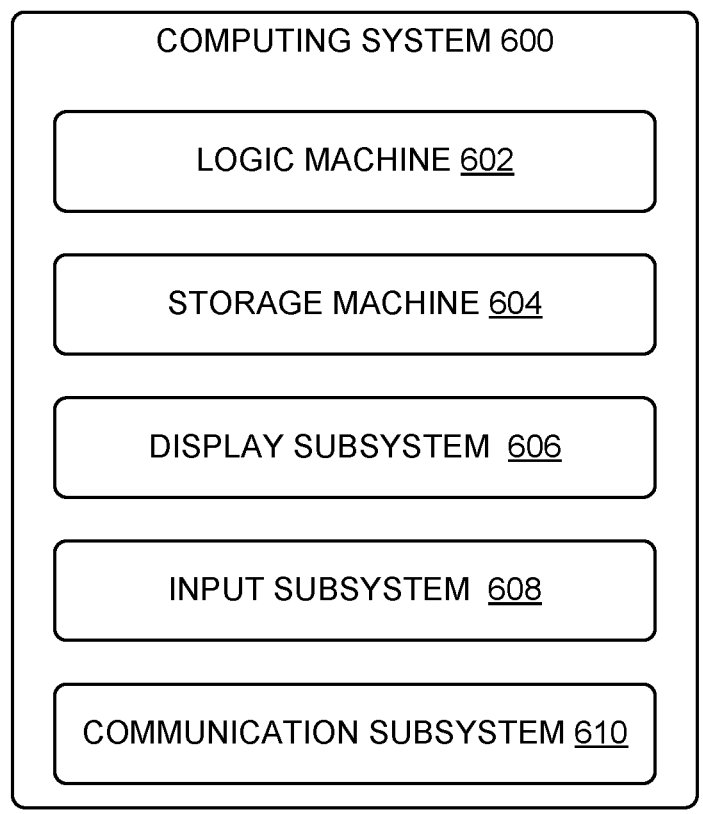
FIG. 6 depicts an example computing system configured to implement the examples provided for herein.

In some examples, determining the identity of target computing device 202b includes extracting one or more characteristics of sonic waveforms 208b that differentiate the target computing device from other target computing devices. For example, referring to FIG. 1, a smartphone 102b in computing environment 100 might emit sonic waveforms having a frequency, phase, and/or amplitude, etc. that differentiates it from other devices in the environment. In some examples, the characteristics are pre-established to be used by target computing device 202b for audio-based identification to host computing device 202a. Accordingly, host computing device 202a may store, in a suitable data structure, data enabling it to match determined waveform characteristics to particular target devices, to thereby aid in determining the identity of a nearby device responsible for the waveform. FIG. 6 and the accompanying discussion provide examples of components that may be used to store waveform characteristics and other data relating to interaction of host and target devices. The pre-establishment of identifying characteristics can happen during prior communication over wireless data link 220, where the devices communicate in advance to determine what waveform characteristics will be used for future sonic identifications that precede subsequent interactivity over wireless data link 220. This is but one example, the identifying waveform characteristics of a target computing device may be established in any suitable manner.

Typically, using analog waveform characteristics as described above, as opposed to sonically transmitting digital data, enables the devices to more efficiently enter into a state in which there is digital interactivity. For one, the analog waveform processing typically is occurring at a time when the devices aren't yet in digital communication, and the mechanism is thus taking early steps to seamlessly connect the devices. Also, the differentiating information to identify the devices can often be more rapidly encoded and decoded than in the case of digital encoding schemes. Further, with regard to phase, frequency, and amplitude, those characteristics can be quickly ascertained and determined on the receiving side of the sonic systems described herein.

The waveform characteristics used to identify target computing devices can take on varying values. In some examples, a static or constant value may be used. For example, a particular target computing device might emit a sonic waveform having one static frequency over a relevant interval. Similarly, a constant phase or amplitude may be used to identify a target computing device. In other examples, the relevant characteristics may vary according to some function or pattern that is predefined and that the host computing device recognizes during decoding. For example, a sonic waveform can alternate between two characteristic frequencies, or provide multiple different frequencies in different portions of a sonic waveform. Frequency can vary according to any appropriate function/scheme, with decoding happening at the host computing device to identify the target computing device sending the sonic waveforms. Similarly, any dynamic scheme can be employed in connection with phase, amplitude, or any other sonic waveform characteristic.

In some examples, receipt of sonic waveforms 208b at host computing device 202a can play a role in its power state. To conserve power (e.g., battery power), the host computing device may operate in a relatively lower power state. The power level in particular may relate to maintaining system-on-chip (SoC) power consumption at a low state until relatively higher power levels are needed, though power level states can be applicable to other components. Various triggering events may lead to transitioning to one or more higher power states, all the way up to a fully active state. In this way, power can be conserved until it is needed, which can be advantageous in battery-powered devices.

Thus, in the present example, host computing device 202a can be operated in a first, relatively lower power state, and subsequently, in a second, relatively higher power state. The transition from the first state to the second state can be made in response to processing the one or more sonic waveforms 208b received at host computing device 202a. For example, sonic processing engine 214a may be in a dormant or ultra-low power state in which it is limited to simply recognizing that an output from microphone subsystem 212a is above some minimum threshold. This in turn could trigger a higher power state in which the sonic processing engine 214a is online and able to process sonic waveforms 208b to make identity determinations of target devices. Still further, once target computing device 202b is identified as being associated with sonic waveforms 208b, a still higher power state may be entered in which the devices interact, e.g., using collaboration software, over wireless data link 220. In other words, transitioning from a lower power state to a higher power state can be made in response to determining the identity of target computing device 202b. For example, a user's smartphone might emit a sonic wave that is picked up by the user's desktop or laptop computer (host device), enabling the desktop/laptop to wake up earlier for more immediate operation.

Figure 3:
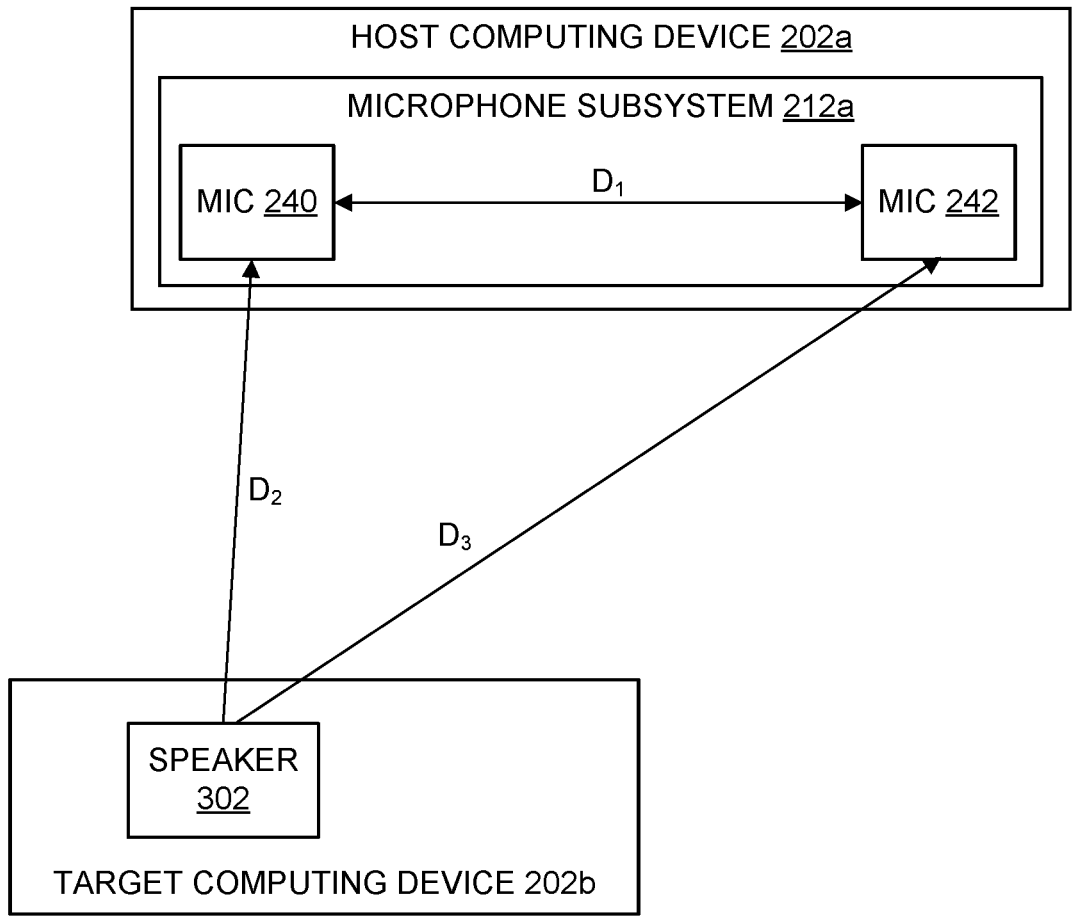
FIG. 3 depicts an example of using sonic waveforms to identify and locate a target computing device, to initialize subsequent connection and interactivity.

Host computing device 202a may be configured to process the sonic waveforms 208b to determine a position of target computing device 202b relative to host computing device 202a. Position determination can enable mapping of one or more target devices in the area surrounding the host device. Referring now to FIG. 3, an embodiment of host computing device 202a is depicted in which microphone subsystem 212a has multiple microphones, namely microphone 240 and microphone 242. Other components of host computing device 202a from FIG. 2 are not shown for simplicity. The figure also shows a speaker 302 from target computing device 202b. Microphones 240 and 242 are separated from one another (e.g., on a chassis of host computing device 202a) by distance D1. Speaker 302 is separated from microphone 240 by distance D2, and from microphone 242 by distance D3.

It will be appreciated that in such an example, sonic waveforms from the speaker will produce different effects on the different microphones of microphone subsystem 212a. Specifically, the different distances $D_2$ and $D_3$ will produce a phase shift/difference at the two different microphones, e.g., as determined by sonic processing engine 214a of FIG. 2. Given a known spacing of the microphones (distance $D_1$), distances $D_2$ and $D_3$ can be determined via triangulation, to thereby establish the position of speaker 302, and thus its associated target device 202b. While only one speaker is shown in FIG. 3, position determinations may be made using additional speakers. Also, in reference to microphone subsystem 212a, more than two microphones may be employed. In some settings, use of multiple microphones in this manner provides the technical benefit of determining location in a quicker, more accurate, and more efficient way than alternate methods in which, for example, sonic receptions at a single microphone are processed over time.

Figure 4:
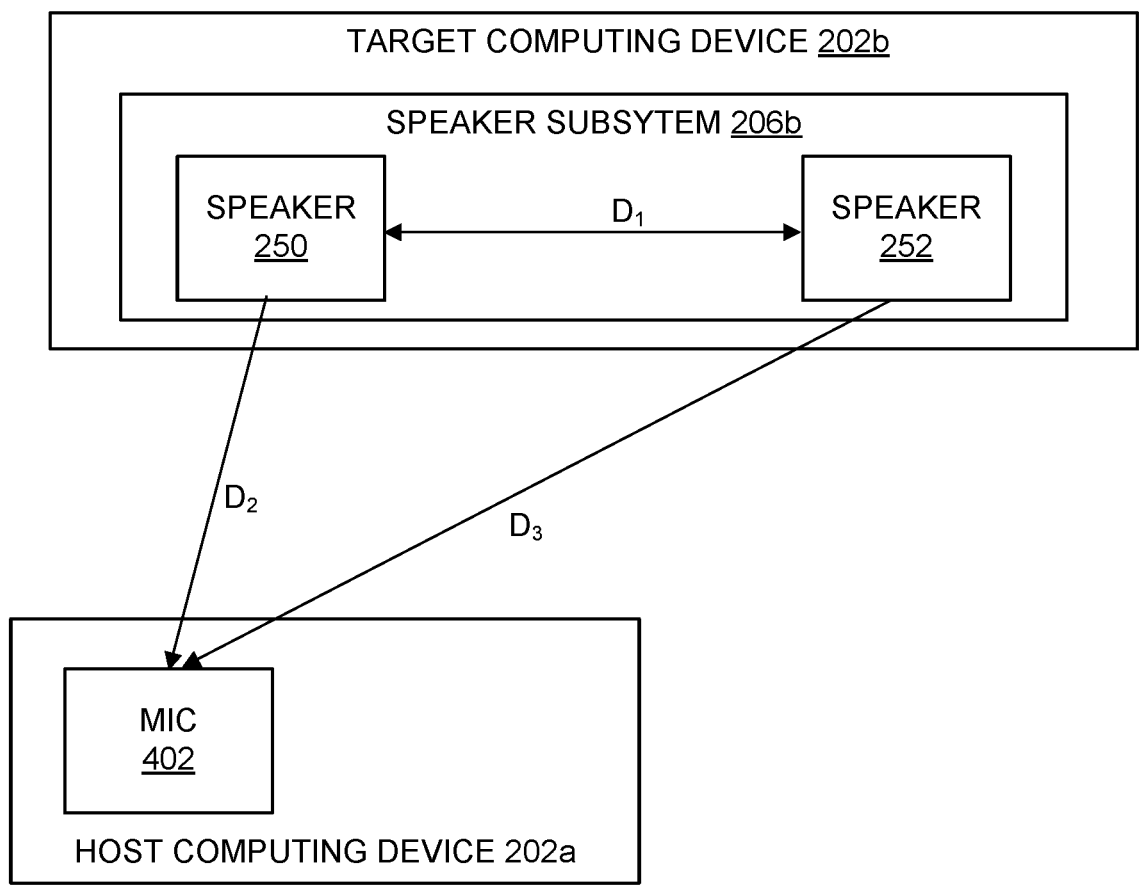
FIG. 4 depicts another example of using sonic waveforms to identify and locate a target computing device, to initialize subsequent connection and interactivity.

Referring now to FIG. 4, an embodiment of target computing device 202b is depicted, in which speaker subsystem 206b has multiple speakers, namely speaker 250 and speaker 252. Other components of target computing device 202b are omitted for clarity. The figure also shows a microphone 402 of host computing device 202b. In this example, there is a known distance $D_1$ between speakers 250 and 252. In this example, the sonic waveforms from target computing device 202b include components provided separately by the speakers 250 and 252. For example, speaker 250 might first transmit sonic waveforms while speaker 252 is silent or idle. Operation can then be toggled so that speaker 252 transmits sonic waveforms while speaker 250 does not transmit. In this way, processing of signals at microphone 402 can assess phase differences resulting from the two different speakers, and thereby triangulate to determine distance $D_2$ and distance $D_3$ to establish the location of microphone 402 and thereby establish location of the target computing device 202b relative to the host computing device. In one example, toggling can be implemented by actuating balance controls for a pair of stereo speakers. Using multiple speakers in this manner can provide the technical benefits of enabling location determination with existing, non-specialized hardware (i.e., existing speakers) and allowing accurate and efficient location determination in settings where the receiving device has only one microphone, or only one microphone positioned or otherwise capable of receiving waveforms of sufficient volume.

In multiple-speaker implementation such as FIG. 4, beamforming may be employed to access a specific receiving device. Specifically, different input signals to the speakers may be processed in different ways-different delay, volume, cancellation effects, etc. This can enable the speaker array to control the size, shape, and/or direction of the sonic waveforms to facilitate communication with a particular target device.

Multiple speaker and microphone implementations may be implemented in a variety of different ways. In the example laptop 102a of FIG. 1, one or two speakers can be positioned on each side of the screen, two user-facing microphones might be placed on top of the display screen, and an additional microphone can be disposed on the back side. This provides the device with numerous options in using sonic waveforms, by acting as a host computing device to listen for and identify target devices, or to transmit sonic waveforms to enable being identified by host computing devices in the environment.

In the examples of FIGS. 3 and 4, the determined location of the target computing device is two-dimensional, or an XY representation. In other examples, different configurations of speakers and/or microphones (i.e., number and position of such audio devices) can yield additional location information, such as placement in a three-dimensional coordinate system. Further, it will be understood that the location determinations can include a distance between the respective devices (e.g., as calculated from phase shift/triangulation). As discussed elsewhere, location determinations may also be lower in detail, and simply include an identification that one device is on a particular side of another device—e.g., left, right, front, back. This can be used to control a layout on one or both of the devices.

Space/location mapping of multiple devices can be implemented in which one or more of the devices both transmit and receive/interpret sonic signals, for example by using the triangulation methods described above. For example, assume the mapping of a space using a host device HO at a reference location, with a target device T1 on the left side of the host device by 30 centimeters and a second target device T2 on the left side of the host device by 60 centimeters. In this case, rather than just relying on the host's listening/interpreting capability to map location, host device HO can also transmit sonic waves to be received and processed at the target devices to determine position, and/or the target devices can sonically communicate with each other to assess position. The multiple determinations can then be combined to generate the full location mapping within the space.

From the above, it will be appreciated that sonic waveform processing can be used to facilitate advancing host and target devices from a state in which they are not digitally connected, to a state in which they connect and interact over a wireless data link. In some examples, this sonic mechanism eliminate user interventions such as operating a user interface to connect devices, selecting connection modes/protocols, switching from one device to another, specifying device locations, entry of PINs or other credentials, etc. The has the technical effects of improving the user experience, increasing the speed of connections, reducing lag, ensuring that correct devices are connected to one another, and increasing connection security.

Referring again to FIG. 2, in response to host computing device 202a determining the identity of the target computing device 202b based on sonic waveforms 208b, host computing device 202a is configured to (1) initialize the wireless data link 220 for communication between the host computing device 202a and the target computing device 202b, and (2) enter a mode of host-target interactivity in which host computing device 202a and target computing device 202b interact via wireless data link 220. Wireless data link 220 can be any appropriate link for digital communication between devices within sonic range of one another, including Bluetooth, WIFI, WIFI direct, NFC, IF, IR, UWB, etc. In response to sonic identification of target computing device 202b, the wireless digital link can be initialized by using the sonic identification as a trigger to activate a connection between the target and host (e.g., in place of the user manually activating a user interface or menu selection). Initializing/activating the wireless data link can include (1) sonic communication, using the sonic system of a host and/or target, of passwords, PINs, passkeys or other credentials needed to establish the wireless data link; (2) sonic communication of device identifiers; (3) sonic communication of protocols or other settings for the wireless data link; as non-limiting examples. Any appropriate mechanism may be used to connect the host and target devices using wireless data link 220.

Once connected, the host computing device 202a and target computing device 202b can interact over wireless data link in a myriad of ways. One device can project content to a display of another device. One device can act as an input controller for another device. Devices can be used together in connection with a host of applications, spanning gaming, productivity, collaboration, sharing content, concerted use of resources spanning multiple devices, etc. Host computing device 202a and target computing device 202b may be implemented with any of the computing system features and components discussed with reference to FIG. 6 to carry out such interactivity.

Position determination, as described with reference to FIGS. 3 and 4, can be useful in connection with device interactivity over wireless data link 220. In particular, the position of the target computing device can be used to at least partly control the interactivity of the host computing device and target computing device occurring over wireless data link 220. For example, a collaborative shared device in a meeting space could sonically determine the identity and locations of multiple target devices. By coupling the sonically determined device identities with known user associations, the described mechanisms can enable generating a list of users present in the meeting space. Further, the device locations could be used to generate a displayable representation of where meeting participants are positioned (e.g., around a conference room table). Location could further be used to identify speakers in audio recordings of a meeting. As indicated above, it will be appreciated that the position determinations herein can also include determination of a distance between host and target computing devices. For example, the triangulation and phase difference mechanisms of FIGS. 3 and 4 can be used to determine the distance between devices. Distance determinations can be used to enhance collaboration in the above meeting space example.

In another example, the position of one computing device, as determined from sonic waveform processing, can control the layout used on another device. In FIG. 1, laptop 102a may connect to display monitor 102d to make use of a larger display. Display monitor 102d, via sonic waveform processing at its microphones (not shown), may determine that laptop 102a is positioned on the left side of display monitor 102d. The display monitor can then, in the eventual non-sonic digital interaction (e.g., WIFI), adopt and use a user interface layout that is appropriate to that relative positioning, which would be different than what would be used if the sonic waveform processing indicated that laptop 102a were on the right side of display monitor 102d. In another example, side-by-side laptops can be used to present a multi-part workspace in which part of the workspace is on one laptop and the other part is on the other laptop. In this case, the sonic mechanism can determine the relative locations and control particulars of the multi-part workspace depending on the sonically detected arrangement of the laptops. Another example, user can engage with wireless docking station with known layout (e.g. mouse, keyboard, monitor positions)

Referring again to FIG. 2, it will be appreciated that transmission/reception of sonic waveforms 208 and communications over wireless data link 220 are separate modes of interactivity. The former typically is analog and is used in these examples to identify target devices and thereby trigger subsequent interaction over the faster wireless data link 220, which carries digital information. In typical examples, the identity and location determinations discussed herein are made via the sonic mechanism independent of any data communicated over wireless data link 220. This provides the technical benefit of achieving various functions (e.g., identity determination) at an early point before the devices are connected in the conventional digital manner over wireless data link 220. This early activity enables the devices to more quickly, seamlessly, and with reduced user intervention, enter into the subsequent conventional digital interaction.

Figure 5:
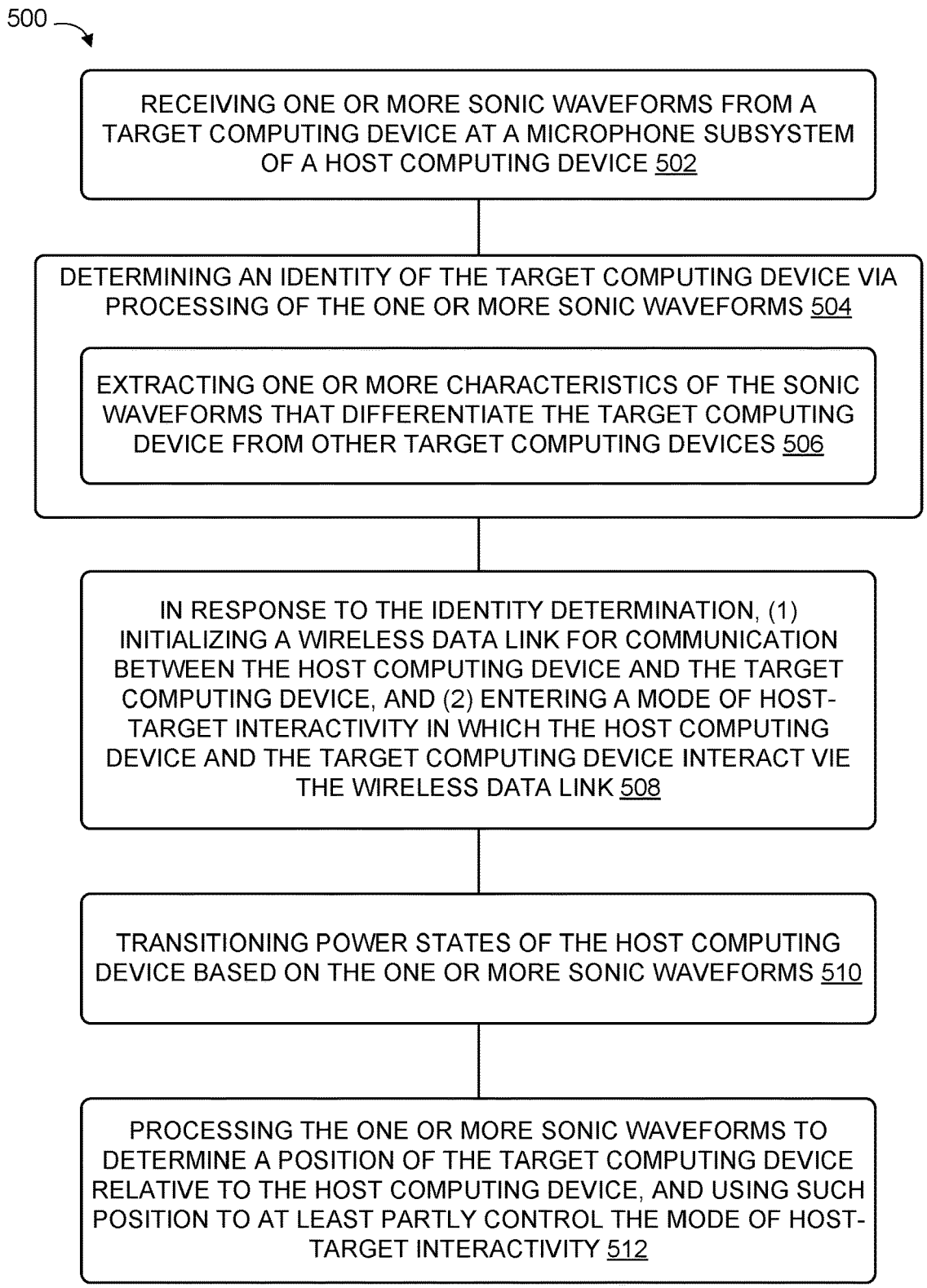
FIG. 5 depicts an example method for using sonic waveforms to identify and locate a target computing device, to initialize subsequent connection and interactivity.

Referring now to FIG. 5, the figure depicts, at a host computing device, a method 500 for interacting with a target computing device. Various references will be made to particular hardware configurations in preceding figures, though it will be appreciated that the method is not tied to those particular configurations and can be enacted on other hardware. The method includes, at 502, receiving one or more sonic waveforms from the target computing device at a microphone subsystem of the host computing device. This may be seen in the example of FIG. 2, where sonic waveforms 208b are transmitted from target computing device 202b via operation of speaker subsystem 206b and sonic driving subsystem 210b. As described elsewhere, in some cases, a speaker subsystem can include more than one speaker, and a microphone subsystem can include more than one microphone.

At 504, method 500 includes determining an identity of the target computing device by processing of the one or more sonic waveforms. As described above, this identification could, for example, include identifying particular smartphones, laptops, tablets, earbuds, display screens to differentiate them from one another or other similar devices in the environment.

As seen at 506, the identity determination can include extracting one or more characteristics of the sonic waveforms that differentiate the target computing device from other target computing devices. Example characteristics can include sonic waveforms having a particular frequency, phase, amplitude, etc., or any time-varying function of such characteristic. In some examples, characteristics are pre-established between host and target computing device, such that a characteristic or characteristics for a target computing device are known to a host computing device for purposes of sonic identification of the target computing device. This pre-establishment of characteristics can enable the devices to more rapidly conduct the sonic interaction leading to the standard operating mode in which they communicate digitally over a wireless data link.

At 508, method 500 includes the host computing device responding to the sonic identity determination to transition to engage in a normal, engaged mode of interactivity with the target computing device. In particular, the method includes the host computing device, in response to the sonic identity determination at step 504, (1) initializing a wireless data link for communication between the host computing device and the target computing device, and (2) entering a mode of host-target interactivity in which the host computing device and the target computing device interact via the wireless data link. As discussed above, this can include connecting the devices via WIFI, Bluetooth, NFC, etc. with little or reduced user action due to the sonic identification. The devices then can interact in a myriad of ways via communication over the wireless data link. Using the sonic identification to trigger a further, alternate mode of connectivity over the wireless data link has technical effects of improving the user experience, increasing the speed of connections, reducing lag, ensuring that correct devices are connected to one another, and increasing connection security.

At 510, method 500 includes transitioning power states of the host computing device based on the one or more sonic waveforms received at step 502. In particular, the method may include operating the host computing device in a first, relatively lower power state, and subsequently, in a second, relatively higher power state, where transition from the first state to the second state is made in response to processing the one or more sonic waveforms received at the host computing device. As previously discussed, an example scenario includes a host computing device in low-power, or hibernating state. The host device then receives sonic waveforms and uses them to identify a target computing device that it wants to interact with. This can then lead to the host computing device entering a higher power state, or "waking up" to engage with the target computing device normally (i.e., over a wireless data link that is different than the acoustic mechanism used to identify the target computing device). This sonic-based wakeup of the device has the technical effect of conserving power.

At 512, method 500 includes processing the one or more sonic waveforms to determine a position of the target computing device relative to the host computing device. The position is used to at least partly control the mode of host-target interactivity referenced at step 508. As indicated above with reference to FIGS. 3 and 4, position may be used in a variety of ways to inform the device-device interaction of the wireless data link.

In some embodiments, the methods and processes described herein may be tied to a computing system of one or more computing devices. In particular, such methods and processes may be implemented as a computer-application program or service, an application-programming interface (API), a library, and/or other computer-program product.

FIG. 6 schematically shows a non-limiting embodiment of a computing system 600 that can enact one or more of the methods and processes described above. Computing system 600 is shown in simplified form. Computing system 600 may take the form of one or more personal computers, server computers, tablet computers, home-entertainment computers, network computing devices, gaming devices, mobile computing devices, mobile communication devices (e.g., smart phone), and/or other computing devices.

Computing system 600 includes a logic machine 602 and a storage machine 604. Computing system 600 may optionally include a display subsystem 606, input subsystem 608, communication subsystem 610, and/or other components not shown in FIG. 6.

Logic machine 602 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 604 includes one or more physical devices configured to hold instructions executable by the logic machine to implement the methods and processes described herein. When such methods and processes are implemented, the state of storage machine 604 may be transformed—e.g., to hold different data.

Storage machine 604 may include removable and/or built-in devices. Storage machine 604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 604 may include volatile, nonvolatile, dynamic, static, read/write, read-only, random-access, sequential-access, location-addressable, file-addressable, and/or content-addressable devices.

It will be appreciated that storage machine 604 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 602 and storage machine 604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 implemented to perform a particular function. In some cases, a module, program, or engine may be instantiated via logic machine 602 executing instructions held by storage machine 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 606 may be used to present a visual representation of data held by storage machine 604. This visual representation may take the form of a graphical user interface (GUI). As the herein described methods and processes change the data held by the storage machine, and thus transform the state of the storage machine, the state of display subsystem 606 may likewise be transformed to visually represent changes in the underlying data. Display subsystem 606 may include one or more display devices utilizing virtually any type of technology. Such display devices may be combined with logic machine 602 and/or storage machine 604 in a shared enclosure, or such display devices may be peripheral display devices.

When included, input subsystem 608 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 610 may be configured to communicatively couple computing system 610 with one or more other computing devices. Communication subsystem 610 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 610 to send and/or receive messages to and/or from other devices via a network such as the Internet.

Accordingly, further to the above, one example includes, at a host computing device, a method of interacting with a target computing device. The method includes receiving one or more sonic waveforms from the target computing device at a microphone subsystem of the host computing device; determining an identity of the target computing device via processing of the one or more sonic waveforms; and in response to said identity determination, (1) initializing a wireless data link for communication between the host computing device and the target computing device, and (2) entering a mode of host-target interactivity in which the host computing device and the target computing device interact via the wireless data link. In this example, determining an identity of the target computing device can include extracting one or more characteristics of the one or more sonic waveforms that differentiate the target computing device from other target computing devices. The one or more differentiating characteristics can include one or more of a frequency, a phase, and an amplitude of the one or more sonic waveforms and/or are pre-established to be used by the target computing device for sonic-based identification to the host computing device. In the above example, the determining of the identity of the target computing device can be performed independently of communications occurring over the wireless data link.

The above example method can further include operating the host computing device in a first, relatively lower power state, and subsequently, in a second, relatively higher power state, where such transition from the first state to the second state is made in response to processing the one or more sonic waveforms received at the host computing device.

The above example method can further include processing the one or more sonic waveforms to determine a position of the target computing device relative to the host computing device, where such position is used to at least partly control the mode of host-target interactivity. In connection with such position determination, the microphone subsystem can include a plurality of microphones, and where the position can be determined by interpreting differences in how the one or more sonic waveforms affect different microphones of the plurality of microphones. In this example position determination can be made by interpreting a phase difference at different microphones of the plurality of microphones.

In the above example, the one or more sonic waveforms can include components provided separately from different speakers of the target computing device, and where the position of the target computing device relative to the host computing device is determined by processing such separately provided components.

A second example is directed to a host computing device, having (1) a microphone subsystem configured to receive one or more sonic waveforms from a target computing device, (2) a logic machine, and (3) a storage machine holding instructions. The instructions are configured to (1) determine an identity of the target computing device via processing of the one or more sonic waveforms received at the microphone subsystem and (2) in response to said identity determination, (a) initialize a wireless data link for communication between the host computing device and the target computing device, and (b) enter a mode of host-target interactivity in which the host computing device and the target computing device interact via the wireless data link. In this second example, the instructions can be further configured to determine the identity of the target computing device by extracting one or more characteristics of the one or more sonic waveforms that differentiate the target computing device from other target computing devices. The one or more characteristics can be pre-established to be used by the target computing device for sonic-based identification to the host computing device, and can include one or more of a frequency, a phase, and an amplitude of the one or more sonic waveforms. The instructions can be further configured to determine the identity of the target computing device independently of communications occurring over the wireless data link. The instructions can further be configured to process the one or more sonic waveforms to determine a position of the target computing device relative to the host computing device, and use such position to at least partly control the mode of host-target interactivity. Regarding such position determination, the microphone subsystem can include a plurality of microphones, and the instructions can be further configured to determine the position of the target computing device relative to the host computing device by interpreting differences in how the one or more sonic waveforms affect different microphones of the plurality of microphones. Again regarding position determination, the one or more sonic waveforms can include components provided separately from different speakers of the target computing device, in which case the instructions can be further configured to determine the position of the target computing device relative to the host computing device by processing such components provided separately from the different speakers of the target computing device.

A third example is directed to a method, at a host computing device, of interacting with a target computing device. This example method includes (1) receiving one or more sonic waveforms from the target computing device at a microphone subsystem of the host computing device; (2) determining an identity of the target computing device via processing of the one or more sonic waveforms; (3) determining a position of the target computing device relative to the host computing device via processing of the one or more sonic waveforms; (4) in response to said identity determination, (a) initializing a wireless data link for communication between the host computing device and the target computing device, and (b) entering a mode of host-target interactivity in which the host computing device and the target computing device interact via the wireless data link; and (5) controlling the mode of host-target interactivity at least partly based on the determined position of the target computing device relative to the host computing device. The microphone subsystem in this example can include a plurality of microphones, and where determining the position of the target computing device relative to the host computing device can include interpreting differences in how the one or more sonic waveforms affect different microphones of the plurality of microphones. The one or more sonic waveforms can include components provided separately from different speakers of the target computing device, and where the position of the target computing device relative to the host computing device can be determined by processing such separately provided components.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method of interacting with a target computing device at a host computing device, the method comprising:
receiving one or more sonic waveforms from the target computing device at a microphone subsystem of the host computing device;
processing the one or more sonic waveforms to determine a position of the target computing device relative to the host computing device and to determine an identity of the target computing device;
in response to said identity determination, (1) initializing a wireless data link for communication between the host computing device and the target computing device, and (2) entering a mode of host-target interactivity in which the host computing device and the target computing device interact via the wireless data link; and
controlling the mode of host-target interactivity at least partly based on the determined position of the target computing device relative to the host computing device.

2. The method of claim 1, where determining an identity of the target computing device includes extracting one or more characteristics of the one or more sonic waveforms that differentiate the target computing device from other target computing devices.

3. The method of claim 2, where the one or more characteristics include one or more of a frequency, a phase, and an amplitude of the one or more sonic waveforms.

4. The method of claim 2, where the one or more characteristics are pre-established to be used by the target computing device for sonic-based identification to the host computing device.

5. The method of claim 1, where the one or more sonic waveforms include one or more analog sonic waveforms;
where the host computing device and the target computing device interact via the wireless data link during the mode of host-target interactivity by sending digital wireless signals between the host computing device and the target computing device; and
where the determining of the identity of the target computing device is performed independently of communications occurring over the wireless data link by processing the one or more analog sonic waveforms.

6. The method of claim 1, further comprising operating the host computing device in a first, relatively lower power state, and subsequently, in a second, relatively higher power state, where such transition from the first state to the second state is made in response to processing the one or more sonic waveforms received at the host computing device.

7. The method of claim 1, where the microphone subsystem includes a plurality of microphones, and where determining the position of the target computing device relative to the host computing device includes interpreting differences in how the one or more sonic waveforms affect different microphones of the plurality of microphones.

8. The method of claim 7, where determining the position of the target computing device relative to the host computing device includes interpreting a phase difference at different microphones of the plurality of microphones.

9. The method of claim 1, where the one or more sonic waveforms include components provided separately from different speakers of the target computing device, and where the position of the target computing device relative to the host computing device is determined by processing such separately provided components.

10. The method of claim 1, further comprising:
generating an audio recording of a conversation between a plurality of users based on audio signals received via the microphone subsystem of the host computing device; and
where controlling the mode of host-target interactivity at least partly based on the determined position of the target computing device relative to the host computing device includes identifying a user associated with the target computing device that is speaking in the audio recording based at least on the position of the target computing device.

11. The method of claim 1, further comprising:
presenting a graphical user interface via a display of the host computing device; and
where controlling the mode of host-target interactivity at least partly based on the determined position of the target computing device relative to the host computing device includes adjusting a layout of the graphical user interface based at least on the determined position of the target computing device relative to the host computing device.

12. A host computing device, comprising:
a microphone subsystem configured to receive one or more sonic waveforms from a target computing device;
a logic machine; and
a storage machine holding instructions configured to:
process the one or more sonic waveforms received at the microphone subsystem to determine a position of the target computing device relative to the host computing device and to determine an identity of the target computing device;
in response to said identity determination, (1) initialize a wireless data link for communication between the host computing device and the target computing device, and (2) enter a mode of host-target interactivity in which the host computing device and the target computing device interact via the wireless data link; and
control the mode of host-target interactivity at least partly based on the determined position of the target computing device relative to the host computing device.

13. The host computing device of claim 12, where the instructions are further configured to determine the identity of the target computing device by extracting one or more characteristics of the one or more sonic waveforms that differentiate the target computing device from other target computing devices.

14. The host computing device of claim 12, where the one or more characteristics are pre-established to be used by the target computing device for sonic-based identification to the host computing device, and include one or more of a frequency, a phase, and an amplitude of the one or more sonic waveforms.

15. The host computing device of claim 12, where the one or more sonic waveforms include one or more analog sonic waveforms;
   where the host computing device and the target computing device interact via the wireless data link during the mode of host-target interactivity by sending digital wireless signals between the host computing device and the target computing device; and
   where the instructions are further configured to determine the identity of the target computing device independently of communications occurring over the wireless data link by processing the one or more analog sonic waveforms.

16. The host computing device of 12, where the microphone subsystem includes a plurality of microphones, and where the instructions are further configured to determine the position of the target computing device relative to the host computing device by interpreting differences in how the one or more sonic waveforms affect different microphones of the plurality of microphones.

17. The host computing device of 12, where the one or more sonic waveforms include components provided separately from different speakers of the target computing device, the instructions being further configured to determine the position of the target computing device relative to the host computing device by processing such components provided separately from the different speakers of the target computing device.

18. A method of interacting with a target computing device at a host computing device, the method comprising:
   receiving one or more analog sonic waveforms from the target computing device at a microphone subsystem of the host computing device;
   determining an identity of the target computing device via processing of the one or more analog sonic waveforms;
   determining a position of the target computing device relative to the host computing device via processing of the one or more analog sonic waveforms;
   in response to said identity determination, (1) initializing a wireless data link for digital wireless communication between the host computing device and the target computing device, and (2) entering a mode of host-target interactivity in which the host computing device and the target computing device interact via the wireless data link by sending digital wireless signals between the host computing device and the target computing device; and
   controlling the mode of host-target interactivity at least partly based on the determined position of the target computing device relative to the host computing device.

19. The method of claim 18, where the microphone subsystem includes a plurality of microphones, and where determining the position of the target computing device relative to the host computing device includes interpreting differences in how the one or more sonic waveforms affect different microphones of the plurality of microphones.

20. The method of claim 18, where the one or more sonic waveforms include components provided separately from different speakers of the target computing device, and where the position of the target computing device relative to the host computing device is determined by processing such separately provided components.

* * * * *